United States Patent
Boulay et al.

(10) Patent No.: US 6,339,532 B1
(45) Date of Patent: Jan. 15, 2002

(54) DEVICE AND METHOD FOR DAMPING A DIGITAL MEDIA DRIVE

(75) Inventors: Steven G. Boulay, Shrewsbury; Stanley Walter Stefanick, Uxbridge, both of MA (US); Richard Ellis Mills, Colorado Springs, CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/590,535

(22) Filed: Jun. 8, 2000

(51) Int. Cl.[7] .................................................. G06F 1/16
(52) U.S. Cl. ...................... 361/685; 361/679; 361/683; 361/684; 361/685; 361/686; 361/687; 361/688; 361/724; 361/725; 361/726; 361/727; 312/223.1; 312/330.1; 312/332.1; 312/333; 312/334.23; 312/334.24; 312/334.26; 312/334.27
(58) Field of Search .......................... 361/679, 683–686, 361/687, 688, 724–727; 312/223.1, 330.1, 332.1, 333, 334.23, 334.24, 334.26, 334.27

(56) References Cited

U.S. PATENT DOCUMENTS 5,463,527 A * 10/1995 Hager et al. ................. 361/685
5,588,728 A * 12/1996 Eldridge et al. .......... 312/332.1
5,914,855 A    6/1999 Gustafson et al. ........... 361/685

* cited by examiner

Primary Examiner—Leo P. Picard
Assistant Examiner—Yean-Hsi Chang
(74) Attorney, Agent, or Firm—Steven K. Barton; William J. Kubida; Hogan & Hartson LLP

(57) ABSTRACT

A hard disk drive is damped in order to reduce tracking errors by isolating the drive from the enclosure it is mounted in using one or more pieces of adhesive viscoelastic material. The hard disk drive is mounted by means of a secondary mounting plate having ventilation holes. Vibrations introduced into the drive from the enclosure, as well as rotational vibrations introduced by the rotation of the drive itself, are substantially damped by the viscoelastic material. As a result, tracking errors are substantially reduced.

13 Claims, 4 Drawing Sheets

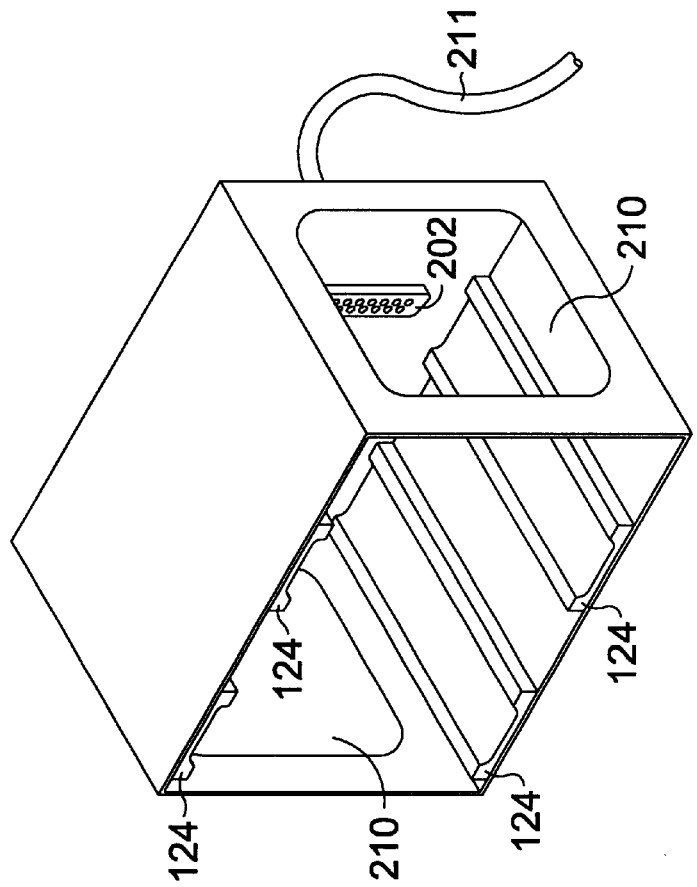
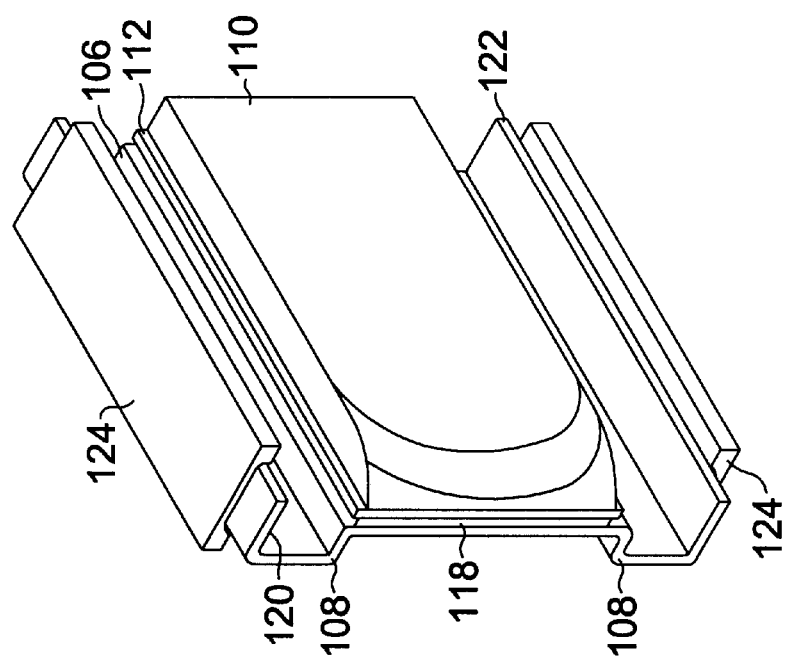

DEVICE AND METHOD FOR DAMPING A DIGITAL MEDIA DRIVE

TECHNICAL FIELD OF THE INVENTION

This invention relates in general to electromechanical digital media drives, such as hard disk drives, floppy disk drives, Zip™ drives, CD-ROM drives, and DVD-ROM drives. More specifically, the invention relates to devices and methods for mounting and damping vibrations of electromechanical digital media drives in computers and other mounting locations.

BACKGROUND OF THE INVENTION

Hard disk drives typically include a group of one or more stacked platters that spin past movable read/write heads at tremendous speeds and within very close tolerances. Each of the platters stores data in a series of concentric regions referred to as "tracks." When reading data to or writing data from the platters, the read/write heads rapidly move from one track to the next as they read or write the data. CD and DVD drives also have a platter, the CD or DVD, that rotates past a movable lens assembly.

As digital media drive, including CD, DVD, and hard disk drives, platters spin, and their head or lens assemblies move, they inevitably vibrate. Vibrations from these drives can couple into other drives of the system if they are not adequately damped. There are additional vibration sources in typical computer systems, including among other sources vibrations induced by user's fingers on keyboards (especially keyboards of notebook computers), loudspeakers, and cooling devices such as fans and blowers that may vibrate as they spin. Computer systems may also be subject to vibrations from other external sources.

Vibrations can sometimes cause the read/write heads in a hard disk drive to miss the track they are supposed to read data from or write data to. This is referred to as a "tracking error," and it may result in corrupted data. These vibrations can be introduced by vibrations or shock from outside the drive, or by internal rotational vibrations induced by the spinning platters. Although some internal damping is employed in modern hard disk drives to reduce tracking errors, they still occur too frequently.

Vibrations from all sources, including drive vibrations, can couple into the atmosphere where they may be perceived as audible noise to users. The cumulative noise from the many drives and fans of a large computer system can produce objectionable noise levels.

U.S. Pat. No. 5,914,855 teaches a drive mounting configuration wherein a disk drive is mounted on a printed circuit card. Each drive card has a plurality of mounting clips compressed onto the edge of the card, with an elastomeric layer disposed between a portion of both a front and a back of the card, the edge of the card, and the mounting clip. The mounting clips are thereupon engaged into a slot of a guide of a card cage to mount the drive, card, elastomeric layer, and clip assembly into the system. U.S. Pat. No. 5,914,855 discloses that the elastomeric layer may be a 0.02-inch (approximately 0.5 millimeter) thick layer of a non-hardening adhesive, and that the elastomeric layer serves to damp and isolate vibrations. The card is illustrated as having card ejectors mounted upon it, as is common with cards slideably installed in a card cage.

It is necessary to ensure that rotating media drives receive adequate cooling airflow. Drives that overheat can destroy themselves, or can fail to read or write correctly while overheated—in some cases overheated drives can write data at inappropriate locations on the platter such that they will not be able to read that data when they are at a lower temperature. It is also necessary that there be a quick and simple way to assemble a drive into a computer system.

Accordingly, there is a need in the art for improved and alternative devices and methods for damping hard disk drives and other digital media drives.

SUMMARY OF THE INVENTION

An assembly for supporting a digital media drive in accordance with this invention includes a mounting structure, such as a secondary plate or runner. The secondary plate is preferably perforated to permit circulation of cooling air. A viscoelastic adhesive member is positioned on one side of the mounting structure to support the digital media drive. The viscoelastic adhesive member need not attach to two sides of the mounting structure. As a result, the digital media drive is substantially isolated from the mounting structure, and both externally and internally induced vibrations are damped, thereby reducing tracking errors. The digital media drive may be, for example, a hard disk drive, a floppy disk drive, a Zip™ drive, a CD-ROM drive, or a DVD-ROM drive.

In another embodiment of this invention, a digital media drive assembly includes first and second guides attached to an enclosure chassis. Also, first and second runners are inserted into the first and second guides. A digital media drive is attached to a mounting plate, and multiple pieces of adhesive viscoelastic material are used to attach the mounting plate and the runners to a secondary plate. As a result, the digital media drive is substantially isolated from the enclosure chassis.

In still other embodiments of this invention, a multi-drive storage device and an electronic system both incorporate the digital media drive assembly described above.

In yet another embodiment of this invention, a digital media drive is mounted on a mounting structure by providing a piece of viscoelastic material and positioning the piece between the digital media drive and the mounting structure so as to support the digital media drive in a spaced-apart relationship with the mounting structure.

BRIEF DESCRIPTION OF THE FIGURES

FIG. 4, an isometric view of a hard disk drive mounted and damped in accordance with a second alternative embodiment of this invention; and FIG. 5, an isometric view of a multiple drive rack for use with hard disk drives mounted and damped in accordance with this invention.

DETAILED DESCRIPTION OF THE ILLUSTRATED EMBODIMENTS

Figure 1B:
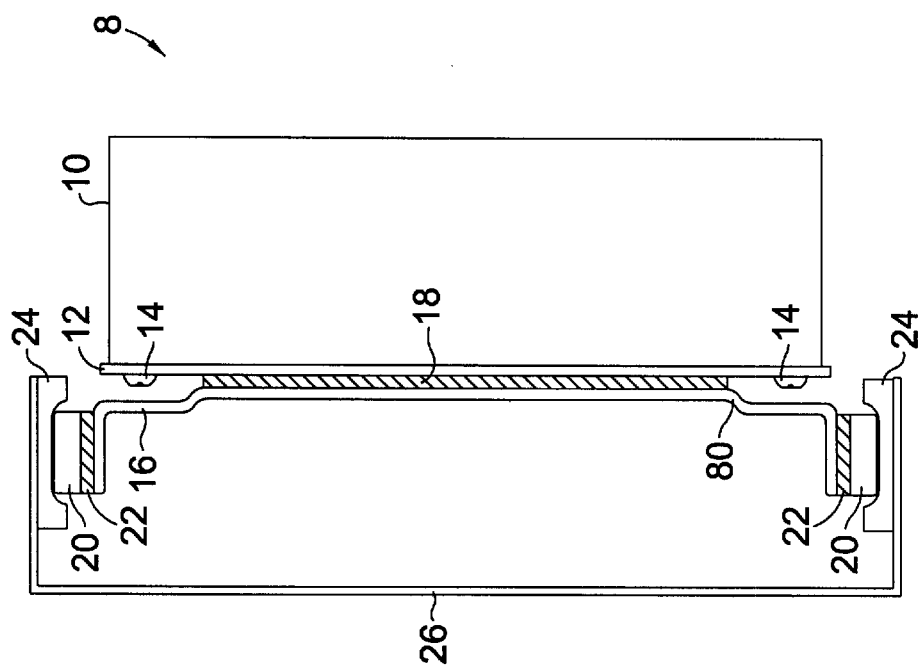
FIGS. 1A and 1B are respective isometric and side views of a hard disk drive mounted and damped in accordance with this invention.
Figure 1A:
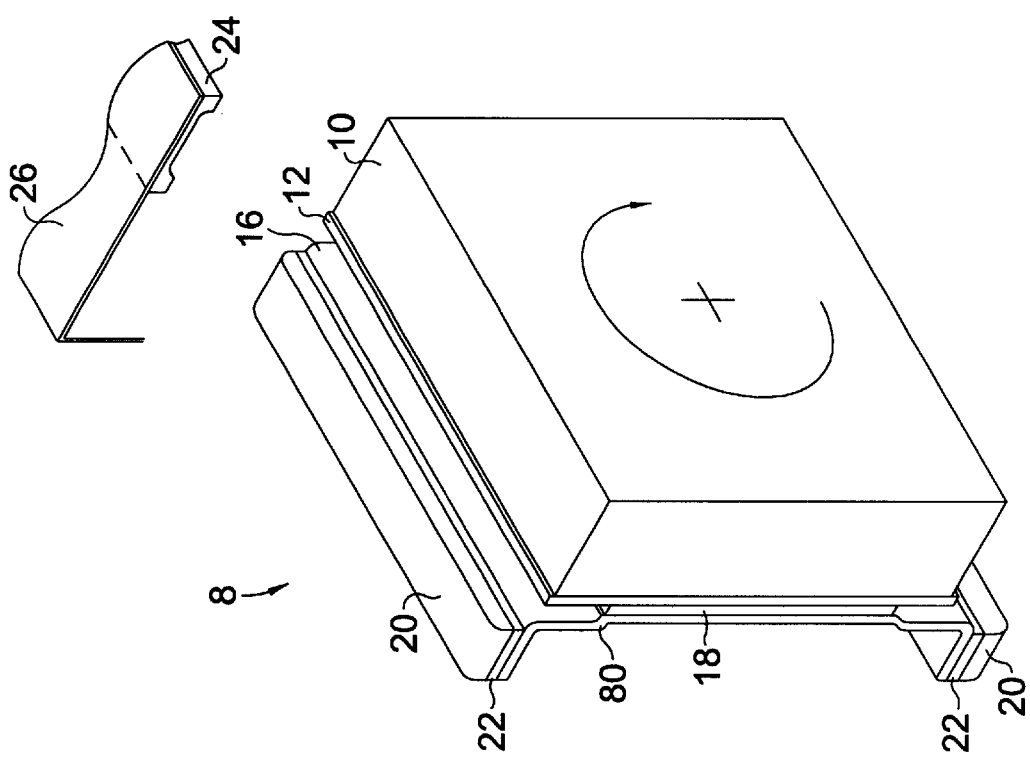

As shown in FIGS. 1A and 1B, a drive assembly 8 includes a hard disk drive 10 mounted on a mounting plate 12 using screws 14. The mounting plate 12 is, in turn, attached to a secondary plate 16 using a viscoelastic adhesive section 18. Also, the secondary plate 16 attaches to runners 20 using additional viscoelastic adhesive sections 22. Further, the runners 20 slide and lock into guides 24 mounted on an enclosure chassis 26.

The secondary plate 16 has a relief bend 80 so that it does not interfere with the screws 14 by which the mounting plate 12 is attached to the drive 10.

Mounting plate 12 and secondary plate 16 each have a plurality of cooling-air holes, preferably arranged in a pattern such that the holes of mounting plate 12 and secondary plate 16 will align in such a manner that air can pass through both plates without undue obstruction. In the preferred embodiment, mounting plate 12 is attached to the drive 10 by way of several suitable screws (not shown).

Figure 1D:
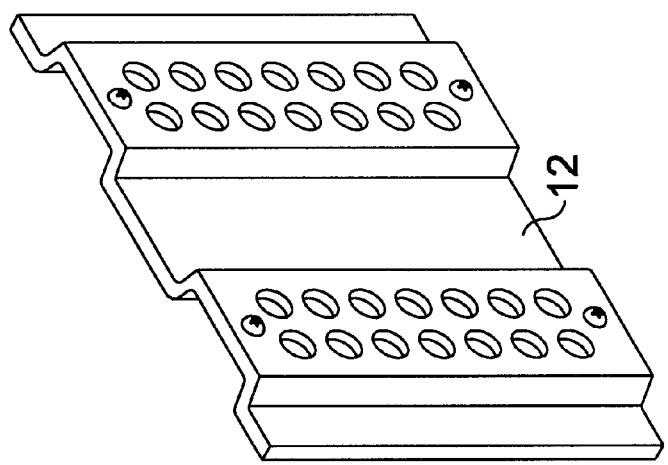
FIG. 1D a view of the mounting plate of the present invention, showing a plurality of cooling air holes.
Figure 1C:
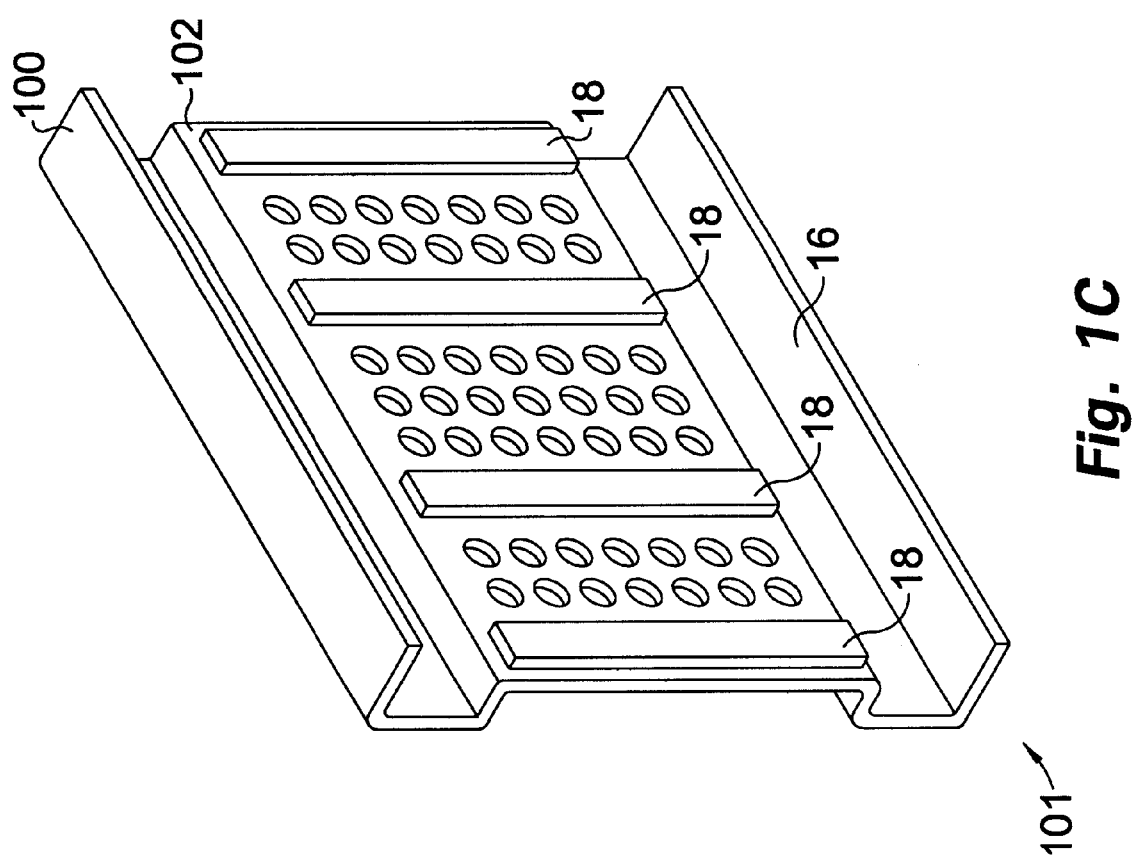
FIG. 1C a view of a secondary mounting plate for mounting a drive in accordance with this invention, showing a plurality of cooling air holes.

Mounting plate 12 has two sides and several edges, a first side to which the drive 10 is mounted, and a second side visible in FIG. 1D to which the viscoelastic adhesive section or sections 18 adheres. Secondary plate 16 has a top surface 100, a bottom surface 101 (hidden in the figure), and a drive mounting surface 102. The viscoelastic adhesive section or sections 18 adheres to, and is disposed between, the drive mounting surface 102 of the secondary plate 16 and the second side of the mounting plate 12. This permits installation of the viscoelastic adhesive section or sections 18 as a double-sided adhesive tape without need to form a clip about the adhesive section 18.

Because the hard disk drive 10 is isolated from the chassis 26 by the adhesive sections 18 and 22, external vibrations and shock carried to the drive 10 through the chassis 26 are significantly damped before arrival, thereby reducing the tracking errors experienced by the drive 10 as a result of external vibrations. In addition, the adhesive section 18 tends to damp shear-force rotational vibrations caused by the hard disk drive 10 itself, thereby reducing tracking errors and radiated noise caused by the rotation of the drive 10. Also, the presence of the adhesive sections 18 and 22 allows the mounting plate 12, the secondary plate 16, and the runners 20 to be designed and manufactured with wide tolerances, because the elastic properties of the adhesive sections 18 and 22 help accommodate significant production variations in dimensions. As a result, the hard disk drive 10 can be mounted in a more compact fashion.

In a first alternative embodiment, the runners 20 and additional adhesive sections 22 are deleted, the secondary mounting plate 16 being formed such that its top surface 100 and bottom surface 101 serve as the runners in slideably mounting the assembly into the guides 24. These surfaces that serve as runners may thereby be formed with the secondary mounting plate as a monolithic element by casting, stamping or extruding. If the secondary mounting plate is formed by extruding, the cooling holes must then be added through a drilling operation.

In a second alternative embodiment, the secondary mounting plate 106 (FIG. 4) is inverted. As with the preferred embodiment, there is a relief bend 108 In the secondary mounting plate 106 to provide room for the mounting screws whereby the mounting plate 112 is attached to the drive 110. The mounting plate 106 is attached to the secondary mounting plate 106 with a layer of viscoelastic adhesive 118. The top flange 120 and the bottom flange 122 of the secondary mounting plate are formed as runners to slideably engage in guides 124. Guides 124 may be mounted in, or attached to, a multiple drive rack 200 (FIG. 5) of a computer system.

Although the invention is described as being for use with a hard disk drive, it will be understood by those having skill in the technical field of this invention that the invention is applicable to other digital media drives as well, including, for example, floppy disk drives, IOMEGA Zip™ drives, CD-ROM drives, and DVD-ROM drives. Also, it will be understood that a wide variety of mechanical mounting structures are available for use with digital media drives (including the structure illustrated in FIGS. 1A, 1B, 1C, and 1D), and that the invention is applicable to many such structures.

Further, it will be understood that a wide variety of other arrangements for the adhesive sections 18 and 22 are possible. For example, the hard disk drive 10 may be directly attached to the adhesive section 18 without the presence of the intervening mounting plate 12; or the adhesive section 18 may be directly attached to the enclosure chassis 26 without the presence of the intervening secondary plate 16, runners 20, and guides 24; or the guides 24 may be attached to the enclosure chassis 26 using adhesive sections in addition to, or in place of, the adhesive sections 22 that attach the secondary plate 16 to the runners 20.

The viscoelastic sections may comprise any viscoelastic material, but are preferably adhesive in addition to being viscoelastic. The adhesive quality permits mounting of the drive without need of additional fasteners attaching the mounting plate 12 to the secondary mounting plate 16. Two adhesive viscoelastic materials used successfully in connection with this invention are the 3M-ISD-112 adhesive manufactured by the 3M Corporation, and the 3099-UHA adhesive manufactured by the Avery Dennison Corporation. Both were tested at a thickness of approximately 0.5 millimeters. Depending on the weight and orientation of the drive being supported, it is expected that a typical thickness for the viscoelastic material will range between approximately 0.13 millimeters and 1.3 millimeters, although other thicknesses are, of course, well within the scope of this invention. It will be understood, of course, that whatever viscoelastic material is used, it should be selected for maximum damping effect within the normal temperature range and vibration frequency range experienced by the supported drive, and for adequate mechanical strength to support the drive if no additional fasteners are to be used.

Figure 3:
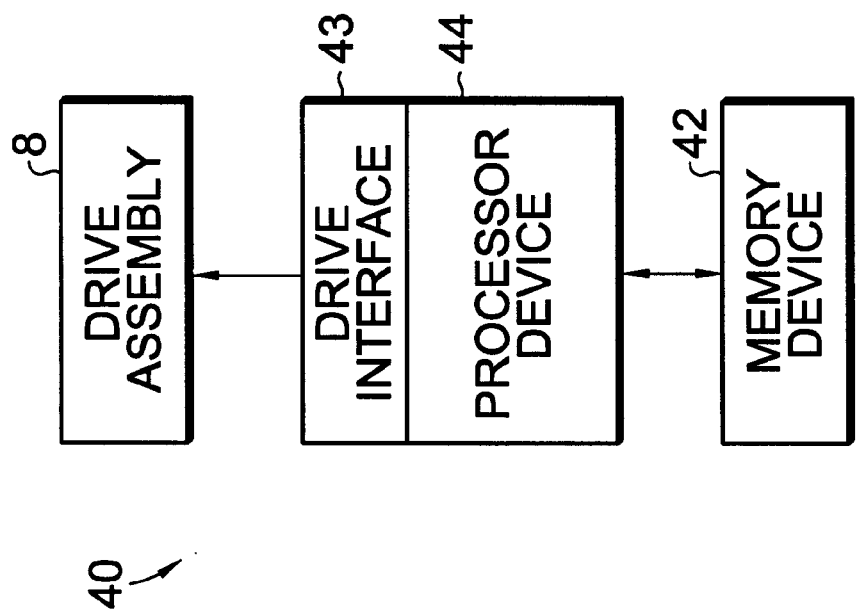
FIG. 3 is a block diagram illustrating an electronic system incorporating the damped hard disk drive of FIGS. 1A, 1B, 1C and 1D.
Figure 2:
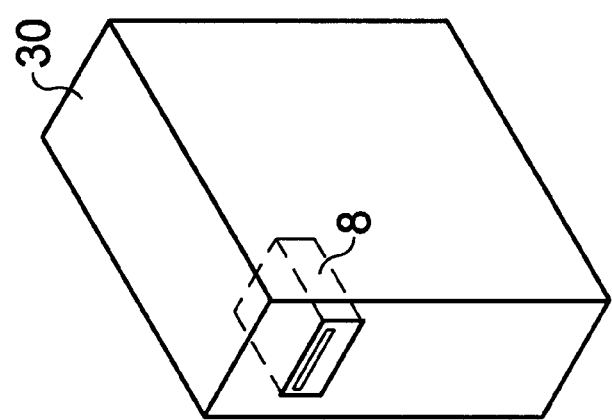
FIG. 2 is an isometric view of a multi-drive storage device incorporating the damped hard disk drive of FIGS. 1A, 1B, 1C and 1D.

The drive assembly 8 of FIGS. 1A, 1B, 1C, and 1D is preferably slideably engaged into a multiple-drive rack or shelf 200 (FIG. 5), whereupon an electrical connector 202 of the multiple-drive rack engages an electrical connector (not shown) connected to the drive 10 of the drive assembly of FIG. 4 or of FIGS. 1A, 1B, 1C, and 1D, and disposed within the drive assembly 8. The electrical connector (not shown) connected to the drive 10 is preferably attached to the secondary plate and electrically connected to the drive 10 through a ribbon cable, although other configurations are possible. The electrical connector 202 of the multiple-drive rack 200 is connected to a drive interface 43 (FIG. 3) of a computing system 40 through a ribbon cable 211. The rack is also cut out such that there are sizeable passageways 210 for cooling air to reach any drives installed therein The computing system 40 may be a stand-alone computing unit, a network file server, or a RAID subsystem; each of which incorporates at least some memory 42 and at least one processor element 44. Drive interface 43 may utilize any of the many commercial standards for drive interfaces, including the various IDE and SCSI standards, to communicate with the drive 10.

Although this invention has been described with reference to particular embodiments, the invention is not limited to these described embodiments. Rather, the invention is limited only by the appended claims, which include within their scope all equivalent devices and methods that operate according to the principles of the invention as described.

What is claimed is:

1. An assembly for supporting a digital media drive, the assembly comprising:
   a mounting structure characterized by a plurality of ventilation holes and comprising a secondary plate;
   a viscoelastic member positioned on the mounting structure to support the digital media drive in a spaced-apart relationship with the mounting structure, wherein the viscoelastic member comprises a piece of adhesive viscoelastic material;
   a mounting plate attached on one side to the digital media drive and on an opposing side to the piece of adhesive viscoelastic material;
   an enclosure chassis;
   first and second guides attached to the enclosure chassis;
   first and second runners inserted into the respective first and second guides; and
   first and second adhesive viscoelastic strips for attaching the secondary plate to the first and second runners.

2. The assembly of claim 1 wherein the viscoelastic member comprises an adhesive viscoelastic member.

3. The assembly of claim 1 wherein the viscoelastic member is between approximately 0.13 and 1.30 millimeters in thickness.

4. The assembly of claim 3 wherein the viscoelastic member is approximately 0.50 millimeters in thickness.

5. A digital media drive assembly comprising:
   a rack;
   first and second guides attached to the rack;
   first and second runners for insertion into the respective first and second guides disposed upon a secondary plate;
   at least one digital media drive;
   a mounting plate attached to the digital media drive; and
   at least one piece of adhesive viscoelastic material for attaching the mounting plate and the runners to the secondary plate, the at least one piece of adhesive viscoelastic material adhering to one face of the secondary plate.

6. The digital media drive assembly of claim 5 wherein the rack is a multiple-drive rack incorporated into a multi-drive storage device.

7. The digital media drive assembly of claim 5, wherein the first and second runners are formed as part of a monolithic unit with the secondary mounting plate.

8. The digital media drive assembly of claim 5, wherein the first and second runners are attached to the secondary mounting plate with adhesive viscoelastic material.

9. The digital media drive assembly of claim 8, further comprising a plurality of connectors mounted to the rack for engaging connectors electrically connected to the digital media drive.

10. The digital media drive assembly of claim 9, wherein the adhesive viscoelastic material is selected from the group consisting of 3M-ISD-112 material and 3099-UHA material.

11. An apparatus for supporting digital media drives to control internally and externally developed vibration, comprising:
    a mounting plate having a side for mounting a digital media drive and a side for supporting the mounting plate and the mounted digital media drive; and
    a secondary mounting plate positioned adjacent and attached to the supporting side of the mounting plate, the secondary mounting plate comprising a drive mounting surface and an isolation member of adhesive viscoelastic material on the drive mounting surface for abuttingly contacting the supporting side of the mounting plate to attach the mounting plate to the drive mounting surface in a spaced-apart relationship and further comprising a runner configured for insertion in a guide of a drive support rack to support the secondary mounting plate and mounting plate.

12. The apparatus of claim 11, wherein the runner includes a contact portion for contacting the guide and an isolation member comprising a viscoelastic material interposed between the contact portion and the drive mounting surface.

13. The apparatus of claim 11, wherein the mounting plate and the secondary mounting plate comprise a plurality of cooling holes, the mounting plate and secondary mounting plate being attached to align at least a portion of the cooling holes on each plate to allow cooling air to flow therethrough.

* * * * *